(12) United States Patent
Lee et al.

(10) Patent No.: US 9,482,909 B2
(45) Date of Patent: Nov. 1, 2016

(54) LIQUID CRYSTAL DISPLAY

(71) Applicant: Samsung Display Co., Ltd., Yongin, Gyeonggi-Do (KR)

(72) Inventors: Se Hyun Lee, Seoul (KR); Hak Sun Chang, Yongin-si (KR); Ki Chul Shin, Seongnam-si (KR); Jang Wi Ryu, Seoul (KR); Cheol Shin, Hwaseong-si (KR); Ho Kil Oh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/710,185

(22) Filed: May 12, 2015

(65) Prior Publication Data
US 2016/0147118 A1 May 26, 2016

(30) Foreign Application Priority Data

Nov. 25, 2014 (KR) ........................ 10-2014-0165474

(51) Int. Cl.
*G02F 1/136* (2006.01)
*G02F 1/1335* (2006.01)
*G02F 1/1343* (2006.01)
*G02F 1/1333* (2006.01)

(52) U.S. Cl.
CPC ... *G02F 1/134309* (2013.01); *G02F 1/133345* (2013.01); *G02F 2001/134345* (2013.01)

(58) Field of Classification Search
CPC .................... G02F 1/134309; G02F 1/133345
See application file for complete search history.

(56) References Cited

FOREIGN PATENT DOCUMENTS

| KR | 10-2007-0079614 A | 8/2007 |
|---|---|---|
| KR | 10-2010-0032324 A | 3/2010 |
| KR | 10-2012-0031801 A | 4/2012 |
| KR | 10-2012-0074967 A | 7/2012 |

*Primary Examiner* — Joseph L Williams
(74) *Attorney, Agent, or Firm* — Innovation Counsel LLP

(57) ABSTRACT

A liquid crystal display according to an embodiment includes: a lower panel including a pixel electrode having a first subpixel electrode and a second subpixel electrode and an insulating layer between the first subpixel electrode and the second subpixel electrode; an upper panel including a common electrode; and a liquid crystal layer disposed between the lower panel and the upper panel. The first subpixel electrode includes a first plate portion, a first stem having a cross portion extending from the first plate portion and a protrusion extending from the cross portion, and a plurality of first branches extending from the first plate portion and the first stem. The second subpixel electrode includes a second plate portion having an opening and a plurality of second branches extending from the second plate portion. The cross portion does not overlap with the second plate portion. The protrusion overlaps with the second plate portion.

14 Claims, 15 Drawing Sheets

Voltage ratio 0.77

Voltage ratio 0.8

Voltage ratio 0.83

Voltage ratio 0.86

LIQUID CRYSTAL DISPLAY

CROSS-REFERENCE TO RELATED APPLICATION

This application claims priority to and the benefit of Korean Patent Application No. 10-2014-0165474 filed in the Korean Intellectual Property Office on Nov. 25, 2014, the entire contents of which are incorporated herein by reference.

BACKGROUND (a) Technical Field

The present disclosure relates to a liquid crystal display.

(b) Description of the Related Art

A liquid crystal display generally includes two sheets of panels with field generating electrodes such as a pixel electrode, a common electrode, and the like, and a liquid crystal layer interposed between the two sheets of panels. The liquid crystal display generates an electric field in the liquid crystal layer by applying a voltage to the field generating electrodes. The strength of the generated electric field determines the alignment direction of the liquid crystal molecules in the liquid crystal layer, which in turn determines the polarization of incident light by the liquid crystal layer. Thus, by controlling the voltage being applied to the field generating electrodes, thereby controlling the strength of the generated electric field, the liquid crystal display controls the polarization of incident light to display images.

A vertically aligned mode liquid crystal display is a liquid crystal display in which the long axis of the liquid crystal molecules is aligned perpendicular to a planar surface of the display panels while the electric field is not applied. To provide a wide viewing angle for the vertically aligned mode liquid crystal display, a method of forming a plurality of domains in which the liquid crystal molecules in adjacent domains are tilted in different directions (e.g., forming cutouts such as minute slits in the field generating electrode, and the like) is used. Further, to suppress texturing or deterioration in luminance around a domain boundary, a method of forming cutouts or patterns in the common electrode is used.

Also, a method of improving the side visibility of the vertically aligned mode liquid crystal display to approximate its front visibility, a technology of varying transmittance by dividing one pixel into two subpixels and differently applying voltages of the two subpixels has been developed.

SUMMARY

The present disclosure provides a liquid crystal display having advantages of improved side visibility and improved light transmittance.

The present disclosure also provides a liquid crystal display having advantages of reducing deterioration in image quality that may occur due to misalignment of a lower panel and an upper panel.

An exemplary embodiment of the present system and method provides a liquid crystal display including: a lower panel including a pixel electrode having a first subpixel electrode and a second subpixel electrode and an insulating layer disposed between the first subpixel electrode and the second subpixel electrode; an upper panel including a common electrode; and a liquid crystal layer disposed between the lower panel and the upper panel. The first subpixel electrode may include a first plate portion, a first stem having a cross portion extending from the first plate portion in a cross shape and a protrusion extending from the cross portion, and a plurality of first branches extending from the first plate portion and the first stem. The second subpixel electrode may include a second plate portion having an opening therein and a plurality of second branches extending from the second plate portion. The cross portion may be free from overlap with the second plate portion and the protrusion may overlap with the second plate portion.

The first subpixel electrode may be positioned on the insulating layer and the second subpixel electrode may be positioned below the insulating layer.

The common electrode may be formed as a plate.

The second plate portion may surround the plurality of first branches.

The opening of the second plate portion may have a planar, rhombus shape.

An edge of the first branch and an edge of the second plate portion adjacent to the first branch may coincide with each other.

An edge of the first branch and an edge of the second plate portion adjacent to the first branch may overlap with each other.

The first plate portion may have a planar, rhombus shape.

A length corresponding to a distance from the center of the rhombus shaped first plate portion to one side may be about 14 μm or less.

The first stem may extend in a diagonal direction of the rhombus shaped first plate portion.

The first subpixel electrode may be configured to receive a first voltage, the second subpixel electrode may be configured to receive a second voltage, and a ratio of the second voltage to the first voltage may be about 0.83 or less.

The plurality of first branches may include a plurality of minute branches extending in four different directions, and the plurality of second branches may include a plurality of minute branches extending in the four different directions.

The four different directions may be orthogonal to each other or parallel to each other.

The plurality of first branches may extend from portions of the first stem excluding the protrusion.

According to the liquid crystal display of the present system and method, it is possible to suppress texturing without deteriorating transmittance while approximating side visibility to front visibility. Further, since cutouts need not to be formed in the common electrode to improve the control force of the liquid crystal molecules, texturing or deterioration in transmittance due to misalignment of the cutouts of the common electrode and the pixel electrode does not occur.

DETAILED DESCRIPTION OF THE EMBODIMENTS

Figure 1:
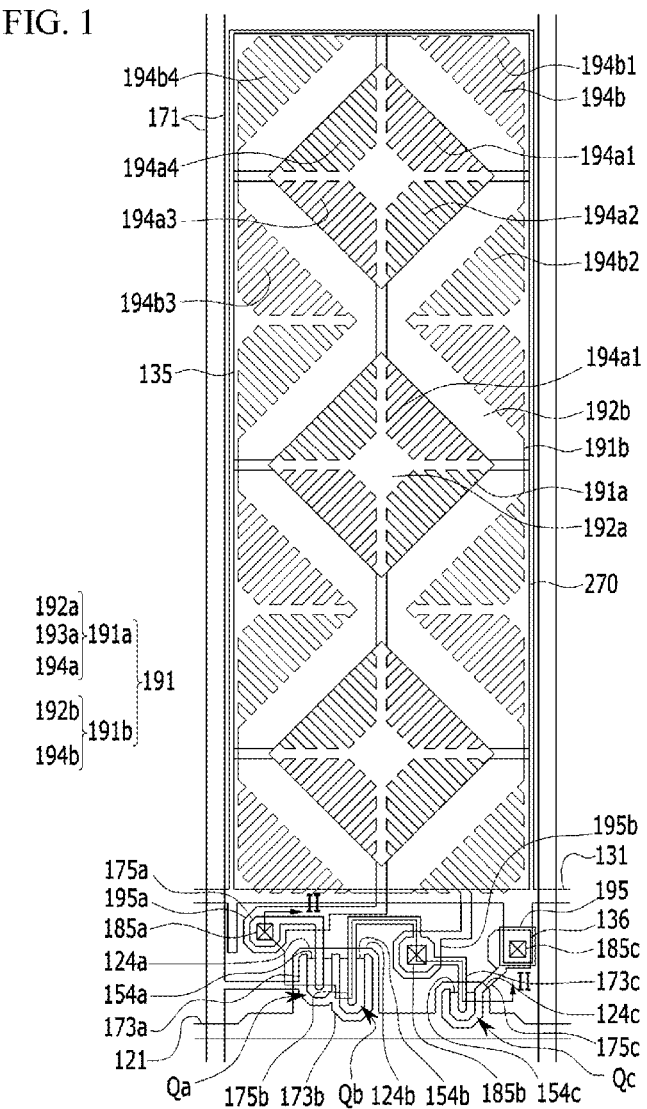
FIG. 1 is a layout view of a liquid crystal display, according to an exemplary embodiment of the present system and method.

The present system and method are described hereinafter with reference to the accompanying drawings in which exemplary embodiments are shown. Those of ordinary skill in the art would realize that the described embodiments may be modified in various different ways without departing from the spirit or scope of the present system and method.

In the drawings, the thickness of layers, films, panels, regions, etc., is exaggerated for clarity. When an element such as a layer, film, region, or substrate is referred to as being "on" another element, it may be directly on the other element, or intervening elements may also be present. In contrast, when an element is referred to as being "directly on" another element, there are no intervening elements present.

A liquid crystal display according to an exemplary embodiment of the present system and method is described in detail with reference to the accompanying drawings.

Figure 2:
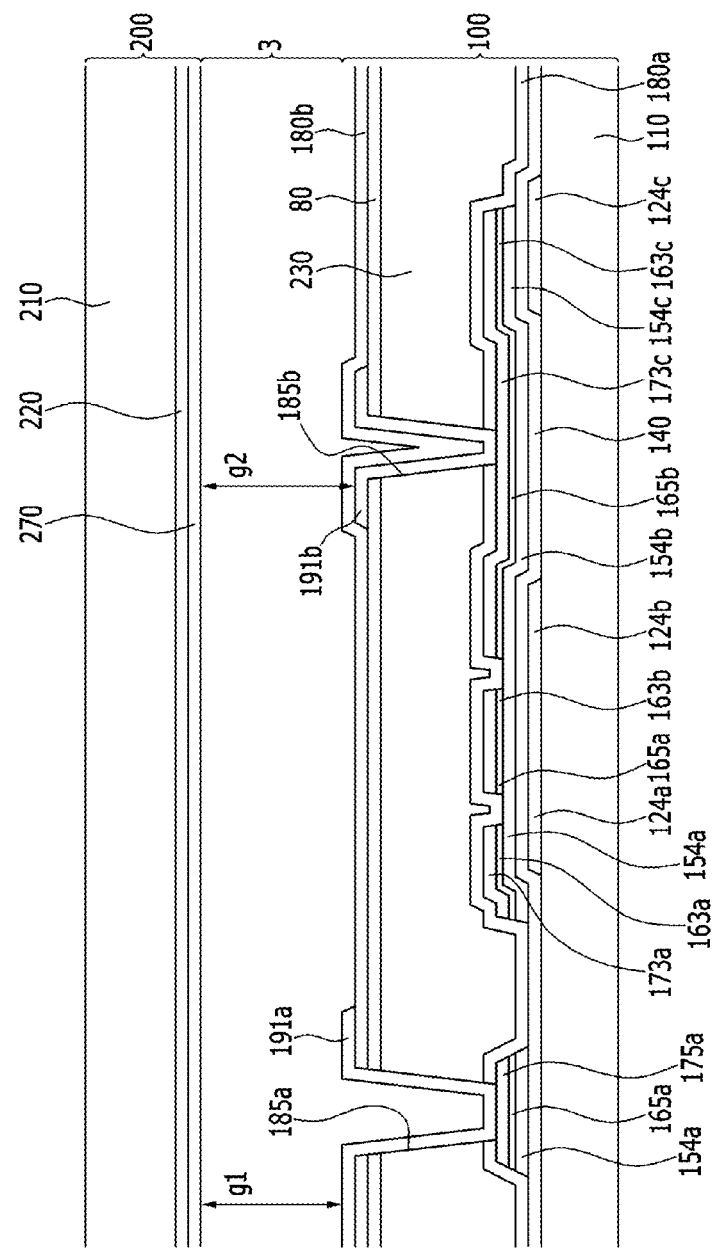
FIG. 2 is a cross-sectional view of the liquid crystal display of FIG. 1 taken along line II-II.
Figure 3:
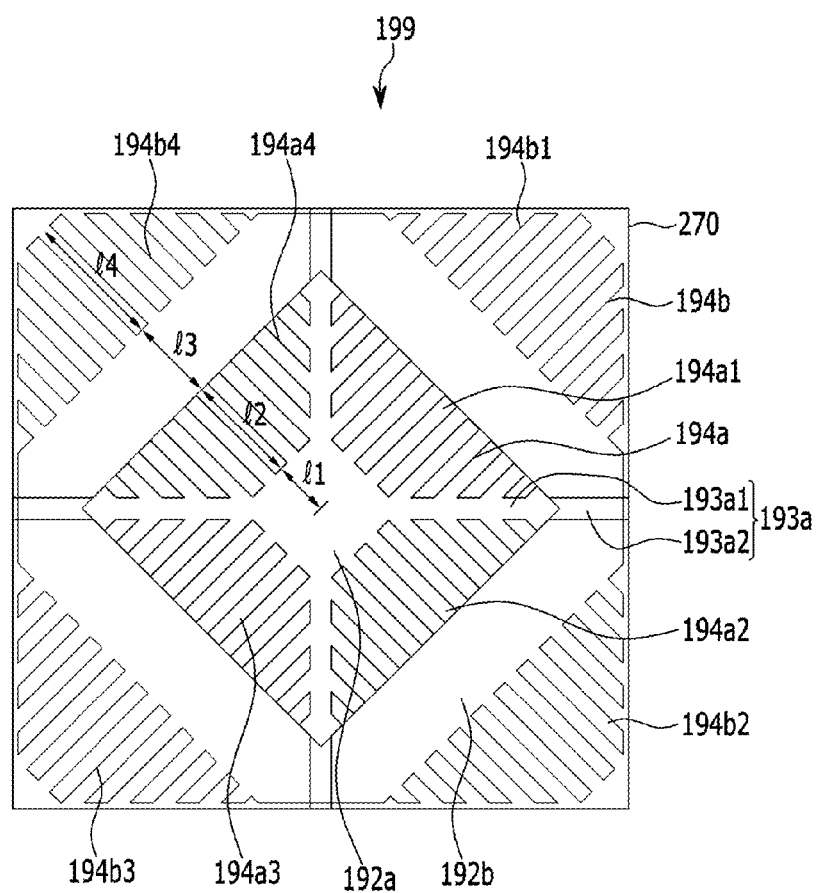
FIG. 3 is a plan view illustrating a basic electrode of a field generating electrode of the liquid crystal display exemplified in FIG. 1.
Figure 4:
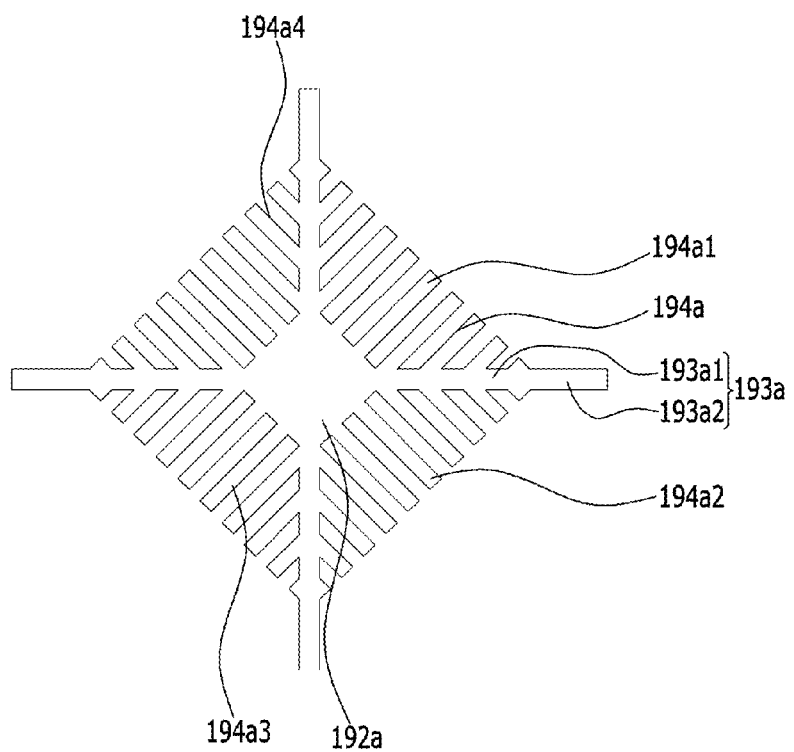
FIG. 4 is a plan view illustrating a first subpixel electrode separated from the basic electrode of the field generating electrode of FIG. 3.
Figure 5:
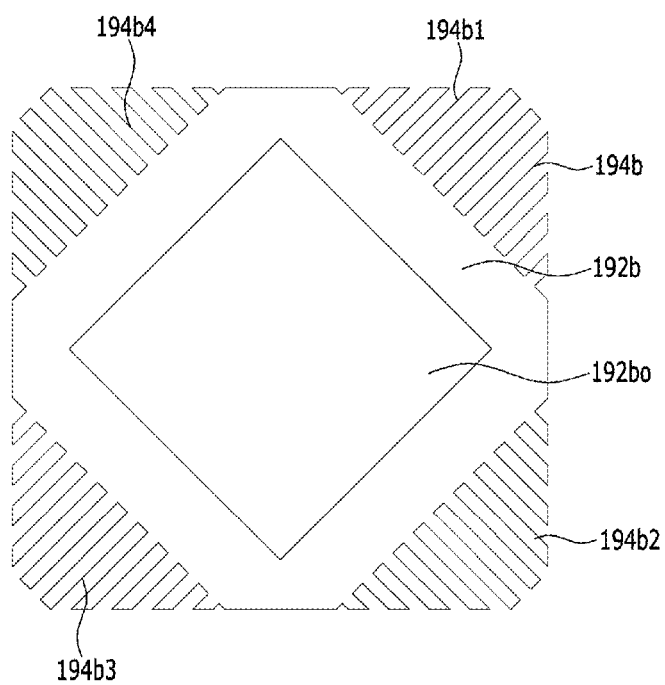
FIG. 5 is a plan view illustrating a second subpixel electrode separated from the basic electrode of the field generating electrode of FIG. 3.
Figure 6:
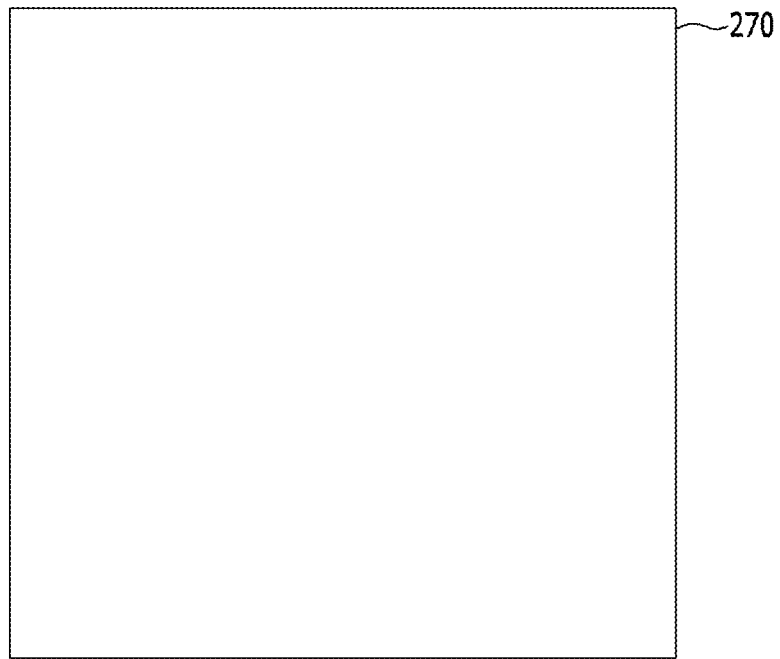
FIG. 6 is a plan view illustrating a common electrode separated from the basic electrode of the field generating electrode of FIG. 3.

FIG. 1 is a layout view of a liquid crystal display according to an exemplary embodiment of the present system and method. FIG. 2 is a cross-sectional view of the liquid crystal display of FIG. 1 taken along line II-II. FIG. 3 is a plan view illustrating a basic electrode of a field generating electrode of the liquid crystal display exemplified in FIG. 1. FIG. 4 is a plan view illustrating a first subpixel electrode separated from the basic electrode of the field generating electrode of FIG. 3. FIG. 5 is a plan view illustrating a second subpixel electrode separated from the basic electrode of the field generating electrode of FIG. 3. FIG. 6 is a plan view illustrating a common electrode separated from the basic electrode of the field generating electrode of FIG. 3.

Referring to FIGS. 1 to 6, the liquid crystal display includes a lower panel 100 and an upper panel 200 facing each other, a liquid crystal layer 3 interposed between the two panels 100 and 200, and a pair of polarizer films (not illustrated) attached to outer surfaces of the panels 100 and 200.

First, the lower panel 100 is described.

A gate line 121, a reference voltage line 131, and a storage electrode 135 are formed on a first insulation substrate 110. The gate line 121 mainly extends in a horizontal direction and transfers a gate signal.

The gate line 121 includes a first gate electrode 124a, a second gate electrode 124b, a third gate electrode 124c, and a wide end portion (not illustrated) for connection with other layers or an external driving circuit.

The reference voltage line 131 may extend in parallel with the gate line 121 and includes the storage electrode 135 surrounding a pixel area. The reference voltage line 131 may have an extension 136. The extension 136 may be connected with a third drain electrode 175c, which is described below.

A gate insulating layer 140 is formed on the gate line 121, the reference voltage line 131, and the storage electrode 135.

A first semiconductor 154a, a second semiconductor 154b, and a third semiconductor 154c, which may be made of amorphous or crystalline silicon, are formed on the gate insulating layer 140.

A plurality of ohmic contacts 163a, 163b, 163c, 165a, 165b, and 165c is formed on the first semiconductor 154a, the second semiconductor 154b, and the third semiconductor 154c. If the semiconductors 154a, 154b, and 154c are oxide semiconductors, the ohmic contacts may be omitted.

On the ohmic contacts 163a, 163b, 163c, 165a, 165b, and 165c and the gate insulating layer 140, a data line 171 including a first source electrode 173a and a second source electrode 173b, a first drain electrode 175a, a second drain electrode 175b, a third source electrode 173c, a third drain electrode 175c are formed. The constituent elements 171, 173a, 173b, 173c, 175a, 175b, and 175c are herein referred to as a data conductor. The second drain electrode 175b is connected with the third source electrode 173c.

The first gate electrode 124a, the first source electrode 173a, the first drain electrode 175a, and the first semiconductor 154a together form a first switching element Qa, which is a thin film transistor. A channel of the thin film transistor is formed in the semiconductor portion between the first source electrode 173a and the first drain electrode 175a. Similarly, the second gate electrode 124b, the second source electrode 173b, the second drain electrode 175b, and the second semiconductor 154b together form a second switching element Qb, also a thin film transistor, and a channel of the thin film transistor is formed in the semiconductor portion between the second source electrode 173b and the second drain electrode 175b. Likewise, the third gate electrode 124c, the third source electrode 173c, the third drain electrode 175c, and the third semiconductor 154c together form a third switching element Qc, also a thin film transistor, and a channel of the thin film transistor is formed in the semiconductor portion between the third source electrode 173c and the third drain electrode 175c.

The first drain electrode 175a, and the second drain electrode 175b, a first passivation layer 180a are formed on the data line 171.

The first passivation layer 180a made of an inorganic insulating material, such as silicon nitride or silicon oxide, is formed on the data conductor 171, 173a, 173b, 173c, 175a, 175b, 175c and the exposed portions of the semiconductors 154a, 154b, and 154c.

A color filter 230 is formed on the first passivation layer 180a. A light blocking member (not illustrated) may be positioned on a region where the color filter 230 is not positioned and overlap a part of the color filter 230. The light blocking member is herein referred to as a black matrix and blocks light leakage.

A capping layer 80 is positioned on the color filter 230. The capping layer 80 prevents the color filter 230 from being lifted and suppresses the contamination of the liquid crystal layer 3 due to an organic material, such as a solvent flowing from the color filter, thereby preventing defects that may otherwise result when a screen is driven, such as an after-image.

A second subpixel electrode 191b is formed on the capping layer 80. The second subpixel electrode 191b forms part of a basic electrode 199 illustrated in FIG. 3 or one or more modifications thereof. Here, the basic electrode 199 includes a pixel electrode 191 including a first subpixel electrode 191a and the second subpixel electrode 191b, and a common electrode 270. A plurality of patterns of the basic electrode 199 may be connected to each other in one pixel area. For example, the liquid crystal display may include two to four basic electrodes 199 in one pixel area. Hereinafter, the pixel electrode 191 including the first and second subpixel electrodes 191a and 191b is described with respect to the basic electrode 199.

A second passivation layer 180b is formed on the second subpixel electrode 191b, and the first subpixel electrode 191a is formed on the second passivation layer 180b. The first subpixel electrode 191a includes a basic electrode 199 illustrated in FIG. 3 or one or more modifications thereof.

The second subpixel electrode 191b is formed to substantially surround the first subpixel electrode 191a.

The first subpixel electrode 191a includes a first plate portion 192a, a first stem 193a, and a plurality of first branches 194a (e.g., including 194a1, 194a2, 194a3 and 194a4). The first subpixel electrode 191a has a substantially rhombus shape except for a protrusion 193a2, which is an end portion of the first stem 193a and described below. The outline of the rhombus shape coincides with a virtual line connecting edges of the first branches 194a. The first plate portion 192a is positioned at the center of the first subpixel electrode 191a, the first stem 193a extends from the first plate portion 192a in a cross shape, and the first branches 194a extend from the first plate portion 192a and the first stem 193a.

The first plate portion 192a has a substantially rhombus shape and is formed as an entire plate that does not include any cutout inside, and the perimeter thereof is surrounded by the first stem 193a and the first branch 194a. A diagonal direction of the rhombus shape formed by the first plate portion 192a may coincide with a diagonal direction of the rhombus shape formed by the first subpixel electrode 191a.

A first length l1 corresponding to a distance from the center of the first plate portion 192a to one side may be about 14 µm or less. When the first length l1 is longer than about 14 µm, control force for the liquid crystal molecules decreases in a first region A1 (see FIG. 7) around the first plate portion 192a and a driving time of the liquid crystal display increases. As a result, texturing in the first region A1 may occur and the transmittance may deteriorate. When the size of the first plate portion 192a is limited, the length of the first branches 194a may be relatively increased. Longer first branches 194a allows the liquid crystal molecules to be controlled by a fringe field generated in the first branches 194a (more specifically, a cross portion 194a1) in the first region A1. A detailed experimental result for the first length l1 is described below.

The first stem 193a extends through a vertex of the rhombus shape of the first subpixel electrode 191a from a corresponding vertex of the rhombus shape of the first plate portion 192a. The protrusion 193a2 extending through the vertex of the rhombus shape overlaps with a second plate portion 192b of the second subpixel electrode 191b to be described below. That is, the first stem 193a includes a cross portion 193a1 that is disposed inside the rhombus shape of the first subpixel electrode 191a and free from overlap with (i.e., does not overlap) with the second plate portion 192b, and includes a protrusion 193a2 that extends from the cross portion 193a1 beyond the rhombus shape of the first subpixel electrode 191a and overlaps with the second plate portion 192b.

The first branches 194a extending from the first plate portion 192a and the first stem 193a (more specifically, the cross portion 193a1) extend in four directions. That is, the first branches 194a include a plurality of first minute branches 194a1 extending obliquely in an upper right direction from the first plate portion 192a and the first stem 193a, a plurality of second minute branches 194a2 extending obliquely in a lower right direction, a plurality of third minute branches 194a3 extending obliquely in a lower left direction, and a plurality of fourth minute branches 194a4 extending obliquely in an upper right direction, such as shown in FIG. 4. The outline of the outer edges of the minute branches 194a1 to 194a4 forms the rhombus shape of the first subpixel electrode 191a.

The second subpixel electrode 191b includes a second plate portion 192b and a plurality of second branches 194b. The second plate portion 192b surrounds the plurality of first branches 194a of the first subpixel electrode 191a on a plane, and the second branches 194b extend from the second plate portion 192b.

The second plate portion 192b has a similar shape to a shape in which four parallelogram plates positioned outside the first to fourth minute branches 194a1 to 194a4 of the first subpixel electrode 191a are combined. The second plate portion 192b generally has an overall shape of a rhombus that has its vertex portions removed and includes an opening 192bo in the shape of a rhombus. Accordingly, the second plate portion 192b generally has a shape similar to a quadrangular ring.

Similar to the first branches 194a of the first subpixel electrode 191a, the second branches 194b of the second subpixel electrode 191b include a plurality of fifth minute branches 194b1 extending obliquely in an upper right direction from the second plate portion 192b, a plurality of sixth minute branches 194b2 extending obliquely in a lower right direction, a plurality of seventh minute branches 194b3 extending obliquely in a lower left direction, and a plurality of eighth minute branches 194b4 extending obliquely in an upper right direction, such as shown in FIG. 5.

The directions in which the first to fourth minute branches 194a1 to 194a4 and the fifth to eighth minute branches 194b1 to 194b4 extend may form angles of about 45 degrees or 135 degrees with the direction in which the gate line 121 extends. The first to fourth minute branches 194a1 to 194a4 and the fifth to eighth minute branches 194b1 to 194b4 may form angles of about 45 degrees or 135 degrees with the first stem 193a. Further, the minute branches extending in different directions may be orthogonal to each other (for example, the first minute branches 194a1 and the second minute branches 194a2) or parallel to each other (for example, the first minute branches 194a1 and the third minute branches 194a3). As such, the first branches 194a of the first subpixel electrode 191a and the second branches 194b of the second subpixel electrode 191b have the plurality of minute branches (194a1, 194b1; 194a2, 194b2; 194a3, 194b3; 194a4, 194b4) extending in different directions to form four domains in which tilted directions of the liquid crystal molecules are differently controlled. As a result, a viewing angle of the liquid crystal display is increased.

When the first subpixel electrode 191a and the second subpixel electrode 191b are overlay as shown in FIG. 3, the outer edges/edge portions of the first to fourth minute branches 194a1 to 194a4 may coincide with or slightly overlap with the edges/edge portions of the opening 192bo. In more detail, in a plan view, an edge adjacent to the second plate portion 192b among the outer edges of the first branches 194a of the first subpixel electrode 191a and an edge adjacent to the first subpixel electrode 191a among the inner edges of the second plate portion 192b of the second subpixel electrode 191b may coincide each other or slightly overlap with each other. In other words, the rhombus shape formed the outline of the outer edges of the first branches 194a and the rhombus shape of the opening 192bo of the second plate portion 192b may substantially coincide with each other. However, the protrusion 193a2 of the first stem 193a of the first subpixel electrode 191a may generally overlap with the second plate portion 192b, such as shown in FIG. 3. According to an exemplary embodiment, the protrusion 193a2 may extend past a most outer edge of the second plate portion 192b. In this case, the end of the protrusion 193a2 may not overlap with the second plate portion 192b.

A first contact hole 185a exposing a part of the first drain electrode 175a and a second contact hole 185b exposing a part of the second drain electrode 175b are formed in the first passivation layer 180a, the color filter 230, the capping layer 80, and the second passivation layer 180b. An extension 136 of the reference voltage line 131 and a third contact hole 185c exposing the third drain electrode 175c are formed in the gate insulating layer 140, the first passivation layer 180a, the color filter 230, the capping layer 80, and the second passivation layer 180b.

A first extension 195a of the first subpixel electrode 191a is physically and electrically connected to the first drain electrode 175a through the first contact hole 185a. A second extension 195b of the second subpixel electrode 191b is physically and electrically connected to the second drain electrode 175b through the second contact hole 185b.

The first subpixel electrode 191a and the second subpixel electrode 191b receive data voltages from the first drain electrode 175a and the second drain electrode 175b through the first contact hole 185a and the second contact hole 185b, respectively.

A connecting member 195 is formed on the extension 136 of the reference voltage line 131 exposed through the third contact hole 185c and the third drain electrode 175c. The third drain electrode 175c is physically and electrically connected to the extension 136 of the reference voltage line 131 through the connecting member 195.

Next, the upper panel 200 is described.

A light blocking member 220 and a common electrode 270 are formed on a second insulation substrate 210.

The common electrode 270 may be formed as a plate that does not include cutouts and patterns, such as shown in FIG. 6.

Although FIG. 2 shows the light blocking member 220 as being formed on the upper panel 200, the light blocking member 220 may be positioned on the lower panel 100. Similarly, although the color filter 230 is described above as being positioned on the lower panel 100, the color filter 230 may be positioned on the upper panel 200.

Alignment layers (not illustrated) may be formed on the inner surfaces of the lower and upper panels 100 and 200 (i.e., the surfaces of the two panels facing each other) and may be vertical alignment layers.

A polarizer (not illustrated) may be provided on each of the two outer surfaces of the lower and upper panels 100 and 200. The transmissive axes of the two polarizers may be orthogonal to each other. One of the transmissive axes may be parallel to the gate line 121.

The liquid crystal layer 3 may have negative dielectric anisotropy, in which case, the long axis of the liquid crystal molecules of the liquid crystal layer 3 is aligned orthogonal to the surfaces of the two panels 100 and 200 when the electric field is not applied. Accordingly, incident light does not pass through the display panel and is blocked by the two polarizers having orthogonal transmissive axes when the electric field is not applied.

The first subpixel electrode 191a and the second subpixel electrode 191b to which the data voltages are applied generate the electric field together with the common electrode 270 of the upper panel 200. As a result, the liquid crystal molecules of the liquid crystal layer 3, which are aligned so as to be orthogonal to the surfaces of the two electrodes 191 and 270 when the electric field is not applied, are tilted in a horizontal direction with respect to the surfaces of the two electrodes 191 and 270. The amount of light passing through the display panel varies according to the tilted degree of the liquid crystal molecules, and thus, the luminance of the pixels may be changed.

A liquid crystal display according to an exemplary embodiment of the present system and method is described above. Hereinafter, a driving method is described.

When a gate-on signal is applied to the gate line 121, the gate-on signal is applied to the first gate electrode 124a, the second gate electrode 124b, and the third gate electrode 124c to turn on the first switching element Qa, the second switching element Qb, and the third switching element Qc. Accordingly, the data voltage applied to the data line 171 is transmitted to the first subpixel electrode 191a and the second subpixel electrode 191b through the turned-on first switching element Qa and second switching element Qb as a first voltage and a second voltage, respectively. In this case, although the same data voltage is applied to the data line 171, the second voltage applied to the second subpixel electrode 191b is divided through the third switching element Qc connected in series with the second switching element Qb. Accordingly, the second voltage applied to the second subpixel electrode 191b is smaller than the first voltage applied to the first subpixel electrode 191a.

Because the magnitude of the second voltage applied to the second subpixel electrode 191b is smaller than the magnitude of the first voltage applied to the first subpixel electrode 191a, the difference in voltage between the first subpixel electrode 191a and the common electrode 270 is larger than the difference in voltage between the second subpixel electrode 191b and the common electrode 270. Accordingly, charging voltages of a first liquid crystal capacitor formed between the first subpixel electrode 191a and the common electrode 270 and a second liquid crystal capacitor formed between the second subpixel electrode 191b and the common electrode 270 represent different gamma curves, and a gamma curve of one pixel voltage becomes a curve combining the gamma curves. A combined gamma curve at the front side coincides with a reference gamma curve at the front, which is most appropriately determined, and a combined gamma curve at the side closely approximates the reference gamma curve at the front. As such, side visibility is improved.

A ratio of the second voltage applied to the second subpixel electrode 191b to the first voltage applied to the first subpixel electrode 191a (second voltage/first voltage) may be about 0.83 or less. As the voltage ratio increases, particularly, in a second region A2 (see FIG. 7) around a portion where the second plate portion 192b of the second subpixel electrode 191b and the protrusion 193a2 of the first stem 193a of the first subpixel electrode 191a overlap with each other, the intensity of the fringe field generated at the edge of the protrusion 193a2 due to the second voltage decreases. When the voltage ratio is larger than about 0.83, the control force for the liquid crystal molecules in the second region A2 may deteriorate and fail to suppress texturing and as a result, the transmittance and the image quality may deteriorate. Experimental results for various voltage ratios are described below.

As described above with respect to the exemplary embodiment of FIG. 1, an output terminal of the second switching element Qb connected to the second subpixel electrode 191b configuring the second liquid crystal capacitor and the third switching element Qc connected to the divided reference voltage line are included so that the voltage charged in the first liquid crystal capacitor and the voltage charged in the second liquid crystal capacitor are different. In addition, various techniques for making the voltages charged in the first liquid crystal capacitor and the second liquid crystal capacitor different may be applied to the present system and method. Thus, even if the liquid crystal display does not include the third switching element Qc and constituent elements related with the switching element Qc (for example, the extension 136 of the reference voltage line 131, the connecting member 195, and the like), the side visibility may be improved, which is described below.

For example, as FIG. 2 shows, the first subpixel electrode 191a is formed on the second passivation layer 180b, and the second subpixel electrode 191b is formed below the second passivation layer 180b. Accordingly, a first gap g1 between the first subpixel electrode 191a and the common electrode 270 is smaller than a second gap g2 between the second subpixel electrode 191b and the common electrode 270. As a result, even though the first subpixel electrode 191a and the second subpixel electrode 191b receive the data voltage having the same magnitude from the data line 171, as described above, the intensity of the electric field generated between the first subpixel electrode 191a and the common electrode 270 is larger than the intensity of the electric field generated between the second subpixel electrode 191b and the common electrode 270. Further, according to a dielectric constant of the second passivation layer 180b, the difference between the intensity of the electric field generated between the first subpixel electrode 191a and the common electrode 270 and the intensity of the electric field generated between the second subpixel electrode 191b and the common electrode 270 may be controlled.

Accordingly, charging voltages of a first liquid crystal capacitor formed between the first subpixel electrode 191a and the common electrode 270 and a second liquid crystal capacitor formed between the second subpixel electrode 191b and the common electrode 270 represent different gamma curves, and a gamma curve of one pixel voltage becomes a curve combining the gamma curves. A combined gamma curve at the front coincides with a reference gamma curve at the front, which is most appropriately determined, and a combined gamma curve at the side closely approximates the reference gamma curve at the front. As such, side visibility is improved.

As another example, the liquid crystal display may include an output terminal of the second switching element Qb connected to the second subpixel electrode 191b configuring the second liquid crystal capacitor and a third switching element Qc connected to a step-down capacitor. In this case, the third switching element Qc may be connected to a different gate line from the gate line to which the first switching element Qa and the second switching element Qb are connected. The third switching element Qc may be turned on after the first switching element Qa and the second switching element Qb are turned on and then turned off. When the third switching element Qc is turned on after switching elements Qa and Qb are turned off, charges move to the step-down capacitor through the third switching element Qc from the second subpixel electrode 191b. This causes the charging voltage of the second liquid crystal capacitor to decrease and the step-down capacitor to charge. Since the charging voltage of the second liquid crystal capacitor is decreased by the step-down capacitor, the charging voltage of the second liquid crystal capacitor is smaller than the charging voltage of the first liquid crystal capacitor.

As another example, the first liquid crystal capacitor and the second liquid crystal capacitor may be connected to different data lines and thus receive different data voltages. As a result, the charged voltages between the first liquid crystal capacitor and the second liquid crystal capacitor may be different from each other. In addition, by various different methods, the charged voltages between the first liquid crystal capacitor and the second liquid crystal capacitor may be differently set.

An alignment of the liquid crystal molecules in a region of the field generating electrode of the liquid crystal display according to an exemplary embodiment of the present system and method is described with reference to FIGS. 7 and 8.

Figure 7:
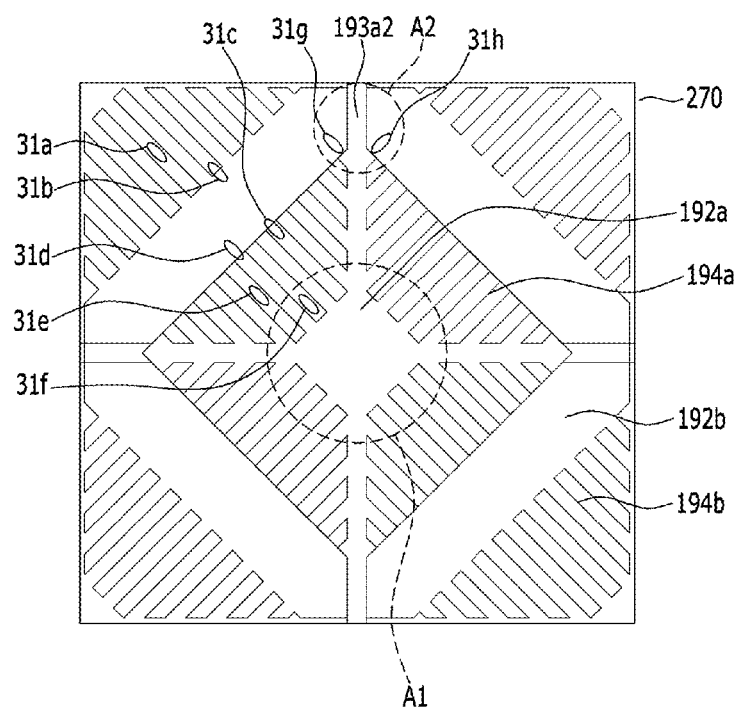
FIG. 7 is a schematic view illustrating alignment directions of directors of the liquid crystal molecules of the liquid crystal display according to an exemplary embodiment of the present system and method.

FIG. 7 is a schematic view illustrating alignment directions of directors of the liquid crystal molecules of the liquid crystal display according to an exemplary embodiment of the present system and method. FIGS. 8 and 9 are cross-sectional views illustrating alignment directions of directors of the liquid crystal molecules of the liquid crystal display according to an exemplary embodiment of the present system and method.

Figure 8:
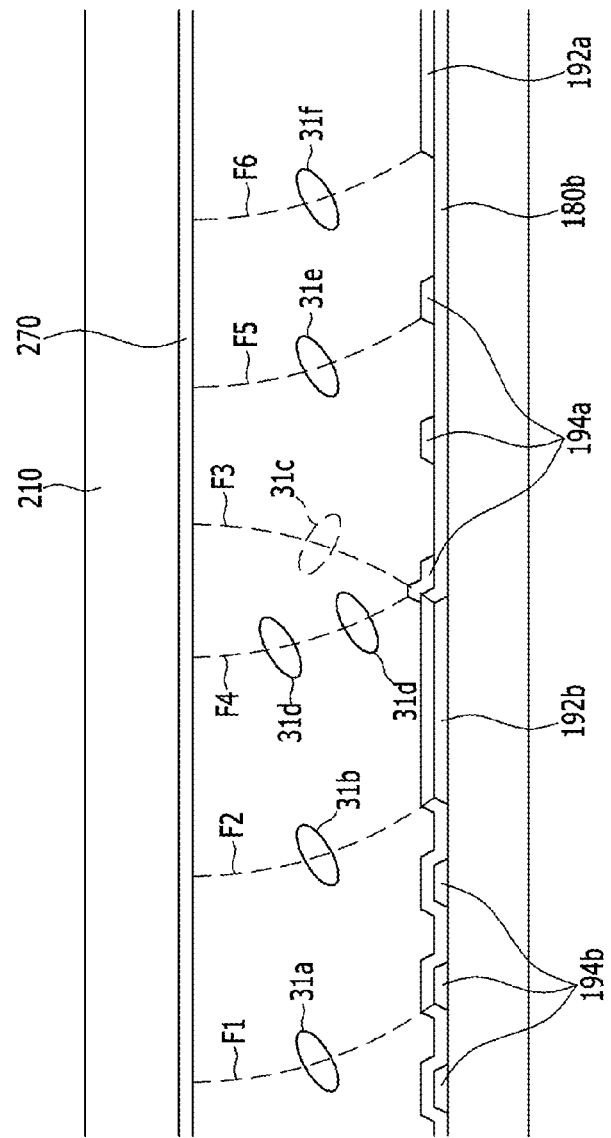
FIGS. 8 and 9 are cross-sectional views illustrating alignment directions of directors of the liquid crystal molecules of the liquid crystal display according to an exemplary embodiment of the present system and method.
Figure 9:
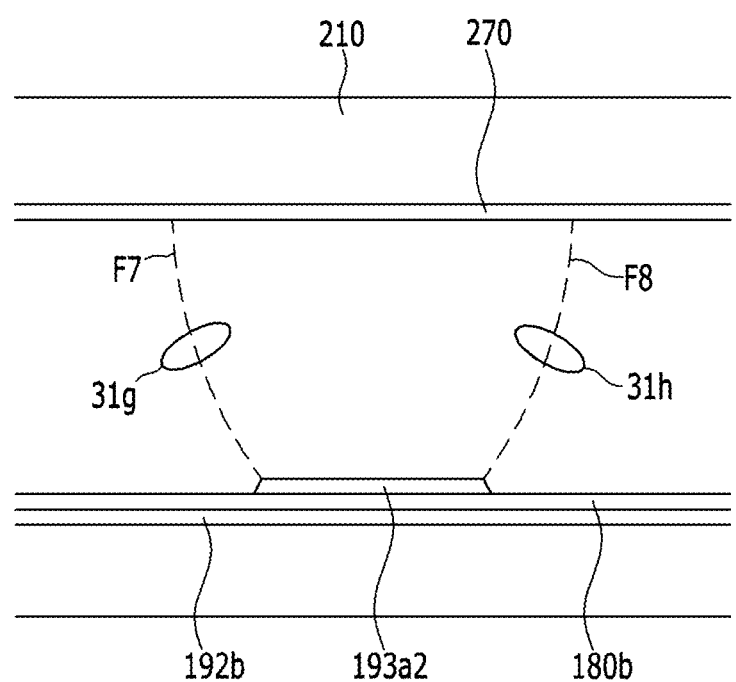
Figure 10A:
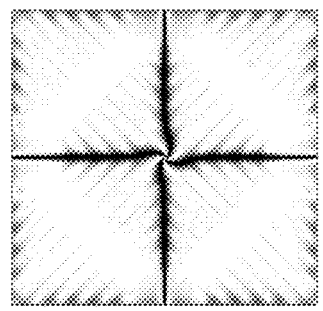
FIGS. 10A, 10B, 10C and 10D are electron microphotographs illustrating results of a first experimental example of the present system and method.
Figure 10B:
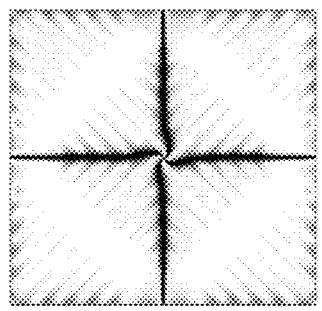
Figure 10C:
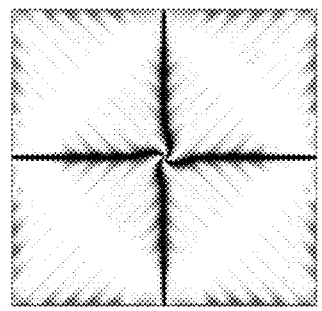
Figure 10D:
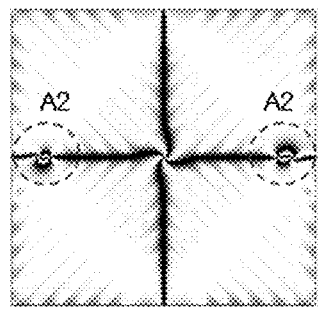

Referring to FIGS. 7 to 9, a first fringe field F1 is generated in a direction vertical to an edge (a first edge) of the second branches 194b of the second subpixel electrode 191b. Due to the effect of the first fringe field F1, first liquid crystal molecules 31a positioned around the second branches 194b are tilted in a direction parallel with the direction of the first fringe field F1 and parallel with a longitudinal direction in which the second branch 194b extends.

A second fringe field F2 is generated at an edge (a second edge) of the second plate portion 192b of the second subpixel electrode 191b adjacent to the second branch 194b. Due to the effect of the second fringe field F2, second liquid crystal molecules 31b positioned around the second edge are tilted in a direction vertical to the second edge, which is the same as the tilted direction of the first liquid crystal molecules 31a.

A third fringe field F3 is generated at an edge (a third edge) of the second plate portion 192b of the second subpixel electrode 191b adjacent to the first branches 194a. Third liquid crystal molecules 31c positioned around the third edge are influenced by the third fringe field F3 to be tilted in a direction vertical to the third edge of the second plate portion 192b. The direction is opposite to the tilted directions of the first liquid crystal molecules 31a and the second liquid crystal molecules 31b.

Further, a fourth fringe field F4 is generated at an edge (a fourth edge) of the first branches 194a adjacent to the second plate portion 192b of the second subpixel electrode 191b. Fourth liquid crystal molecules 31d near the fourth edge are tilted in a direction vertical to the fourth fringe field F4. The direction is the same as the tilted directions of the first liquid crystal molecule 31a and the second liquid crystal molecule 31b.

As described above, the intensity of the electric field formed between the first subpixel electrode 191a and the common electrode 270 is greater than the intensity of the electric field formed between the second subpixel electrode 191b and the common electrode 270. Further, the intensity of the third fringe field F3 is reduced due to shielding by the first branches 194a. Therefore, the intensity of the fourth fringe field F4 is larger than that of the third fringe field F3. Accordingly, the liquid crystal molecules positioned around the boundary of the first subpixel electrode 191a and the second subpixel electrode 191b are influenced to a greater extent by the fourth fringe field F4, which has a greater intensity than the third fringe field F3. Thus, the third liquid crystal molecules 31c are tilted in a direction parallel to that of the nearby second and fourth liquid crystal molecules 31b and 31d. Accordingly, texturing does not occur around the boundary of the first subpixel electrode 191a and the second subpixel electrode 191b, and the luminance of the liquid crystal display is increased.

A fifth fringe field F5 is generated at an edge (fifth edge) of the first branch 194a. Fifth liquid crystal molecules 31e near the first branch 194a of the first subpixel electrode 191a are influenced by the fifth fringe field F5 to be tilted in a direction parallel with the fifth fringe field F5 and parallel with the longitudinal direction in which the first branch 194a extends.

A sixth fringe field F6 is generated at an edge (sixth edge) of the first plate portion 192a. Sixth liquid crystal molecules 31f near the first plate portion 192a of the first subpixel electrode 191a are influenced by the sixth fringe field F6 to be tilted in the same direction as the tilted direction of the fifth liquid crystal molecules 31e.

In the second region A2 around the portion where the second plate portion 192b of the second subpixel electrode 191b and the protrusion 193a2 of the first stem 193a of the first subpixel electrode 191a overlap each other, a seventh fringe field F7 and an eighth fringe field F8 are generated at both edges (seventh and eighth edges) of the protrusion 193a2, respectively. Seventh liquid crystal molecules 31g positioned around the seventh edge are tilted in a direction vertical to the seventh edge by the seventh fringe field F7 and parallel with the extending direction of the first branch 194a by influence of neighboring liquid crystal molecules, which are also tilted in the direction parallel with the extending direction of the first branch 194a. Eighth liquid crystal molecules 31h positioned around the eighth edge are also tilted in a direction parallel with the extending direction of the first branch 194a by the seventh fringe field F7 and the tilted direction of the neighboring liquid crystal molecules.

Accordingly, even though cutouts for controlling the seventh and eighth liquid crystal molecules in the second region A2 are not formed at the common electrode 270, the seventh and eighth liquid crystal molecules are controlled by the protrusion 193a2 of the first stem 193a of the first subpixel electrode 191a, thereby suppressing texturing that may otherwise be generated in the second region A2 and improving the luminance. According to the exemplary embodiment shown in FIG. 6, the cutouts are not formed at the common electrode 270 to prevent a loss of transmittance which may be generated by misalignment of the cutouts of the common electrode 270 and the pixel electrode 191. Further, a mask and a process for forming the cutouts at the common electrode 270 are not required.

Next, some Experimental Examples of the present system and method are described with reference to FIGS. 10 to 15.

FIGS. 10A, 10B, 10C and 10D are electron microphotographs illustrating results of a first experimental example of the present system and method.

Referring to FIGS. 10A, 10B, 10C and 10D, in the liquid crystal display having the pixel structure according to the exemplary embodiment of FIGS. 1 to 6, changes in luminance by varying the ratio of the second voltage applied to the second subpixel electrode 191b to the first voltage applied to the first subpixel electrode 191a are illustrated in electron microphotographs. FIGS. 10A, 10B, 10C and 10D illustrate results when the voltage ratios are 0.77, 0.8, 0.83, and 0.86, respectively. Since the tilted direction of the liquid crystal molecules are opposite to each other on a domain boundary, which substantially coincides with the first branches 194 of the first subpixel electrode 191a, the domain boundary is illustrated to be relatively dark. When the voltage ratio is 0.83 or less, it can be seen that the direction of the liquid crystal molecules on the domain boundary is controlled well except for typical transmittance deterioration. However, when the voltage ratio is 0.86, texturing having a ring shape is generated in the second region A2, and as a result, the transmittance is reduced as compared with the cases in which the voltage ratio is 0.83 or less. It is understood that the texturing occurs because the size of the fringe field controlling the liquid crystal molecules in the second region A2 becomes so small that it cannot suppress the generation of the textures when the voltage ratio is larger than 0.83.

Figure 11A:
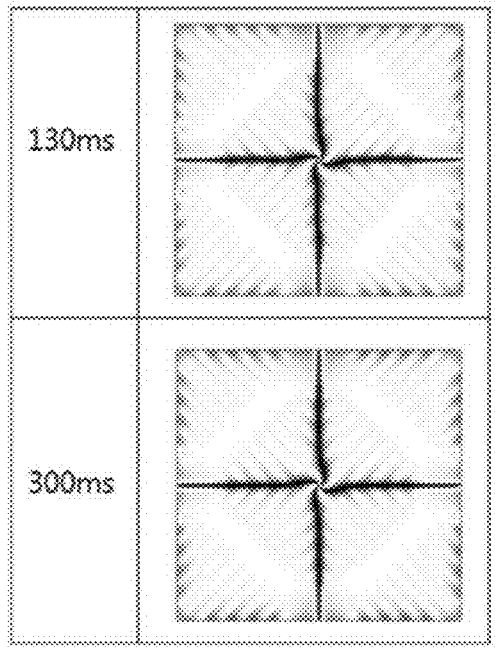
FIGS. 11A, 11B and 11C are electron microphotographs illustrating results of a second experimental example of the present system and method.
Figure 11B:
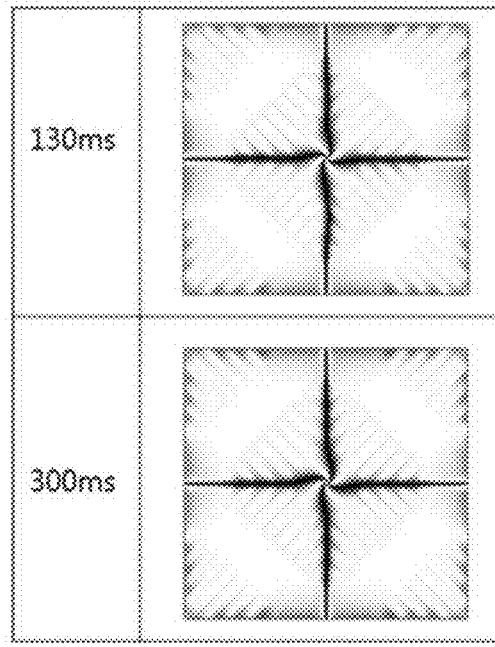
Figure 11C:
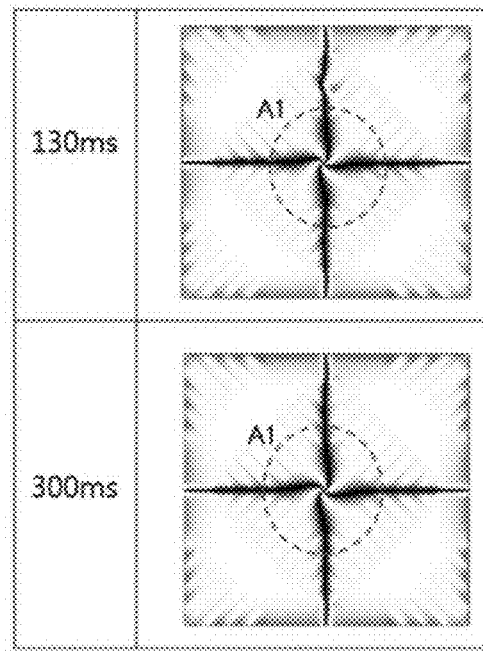

FIGS. 11A, 11B and 11C are electron microphotographs illustrating results of a second experimental example of the present system and method.

Referring to FIGS. 11A, 11B and 11C, in the liquid crystal display having the pixel structure according to the exemplary embodiment of FIGS. 1 to 6, results of experiments in which the ratio of the first plate portion 192a and the first branch 194a of the first subpixel electrode 191a and the second plate portion 192b and the second branch 194b of the second subpixel electrode 191b is changed while maintaining the entire size of the pixel electrode 191 is illustrated.

FIGS. 11A, 11B and 11C illustrate cases in which lengths l1, l2, l3, and l4 of the pixel electrode 191 (see FIG. 3) are formed to be 11 μm, 25 μm, 21 μm, and 29 μm; 14 μm, 22 μm, 25 μm, and 25 μm; and 17 μm, 22 μm, 23.5 μm, and 23.5 μm, respectively. The first length l1 corresponds to a distance from the center of the first plate portion 192a to one side. The second length l2 corresponds to a length of the first branch 194a extending from one side of the first plate portion 192a. The third length l3 represents corresponds to a gap between an inner side and a right side of the second plate portion 192b that are adjacent to each other. And the fourth length l4 corresponds to a largest length of the second branch 194b. The sum of the lengths l1, l2, l3, and l4 is substantially equal to half of the diagonal length of the pixel electrode 191 configuring the basic electrode 199.

The three upper photographs of FIGS. 11A, 11B and 11C are electron microphotographs taken 130 ms after each case is driven. The three lower photographs of FIGS. 11A, 11B and 11C are electron microphotographs taken 300 ms after each case is driven. In the cases of FIGS. 11A and 11B in which the first distance l1 is 11 μm and 14 μm, respectively, it can be seen that even though the driving time elapses, the liquid crystal molecules are controlled well over the entire area. However, when the first distance l1 is 17 μm, as in the case of FIG. 11C, it can be seen that in the first region A1 around the first plate portion 192a, the control force for the liquid crystal molecules is decreased and the transmittance is reduced. It is understood that this is caused because the length of the first branches 194a is decreased as the size of the first plate portion 192a is increased, and thus, influence by the fringe field of the first branches 194a in the first region A1 is reduced.

Data measured with respect to a change in luminance according to the size of the first plate portion 192a are described with reference to FIGS. 12 and 13.

Figure 12:
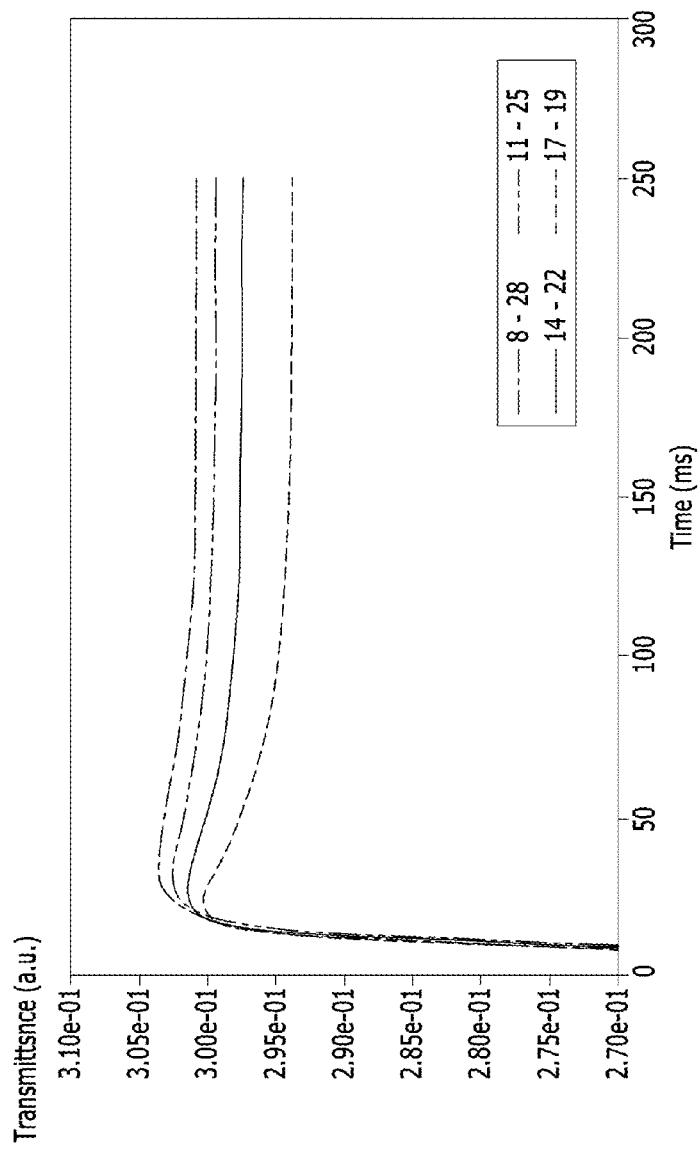
FIGS. 12 and 13 are graphs illustrating results of a third experimental example of the present system and method.
Figure 13:
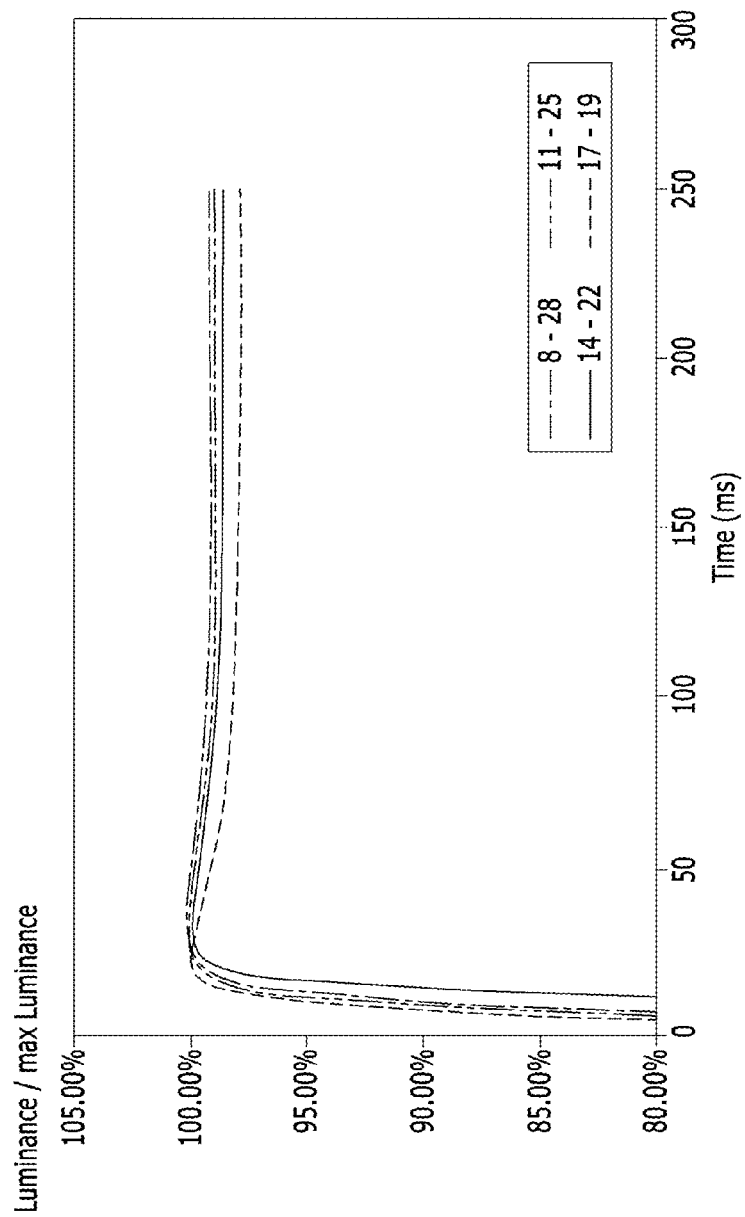

FIGS. 12 and 13 are graphs illustrating results of a third experimental example of the present system and method.

FIG. 12 is a graph illustrating a change in transmittance over time for varying sizes of the first plate portion 192a. FIG. 13 is a graph of the transmittance of FIG. 12 normalized as luminance. An experiment is performed with respect to four cases in which the sum of the first length l1 and the second length l2 of the first subpixel electrode 191a is maintained at 36 μm, while increasing the first length l1 and decreasing the second length l2. The size of the second subpixel electrode 191b is also maintained in the four cases so as to maintain the area ratio. In each graph, a one-dot dashed line represents a case in which l1 and l2 are 8 μm and 28 μm, respectively, a two-dot dashed line represents a case in which l1 and l2 are 11 μm and 25 μm, respectively, a solid line represents a case in which l1 and l2 are 14 μm and 22 μm, respectively, and a dotted line represents a case in which l1 and l2 are 17 μm and 19 μm, respectively.

As illustrated in the two graphs, it can be seen that when the first length l1 is 14 μm, deterioration of luminance over time after reaching maximum luminance is significantly less than when the first length l1 is 17 μm. Accordingly, when the first length l1 is larger than 14 μm, defects of image quality such as deterioration of luminance or generation of afterimages may become problematic.

FIGS. 14A, 14B, 15A and 15B illustrate structures of a first subpixel electrode, and their corresponding electron microphotographs, used in a fourth experimental example and a result thereof.

Figure 14A:
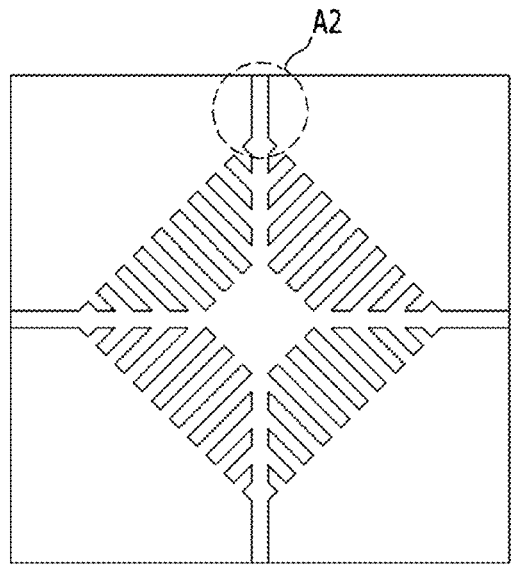
FIGS. 14A, 14B, 15A and 15B illustrate structures of a first subpixel electrode, and corresponding electron microphotographs, used in a fourth experimental example and a result thereof.
Figure 14B:
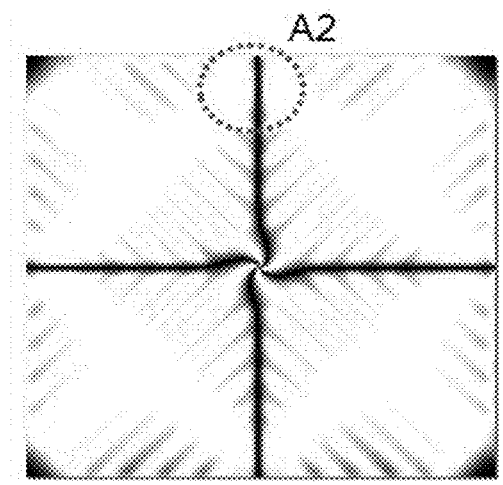
Figure 15A:
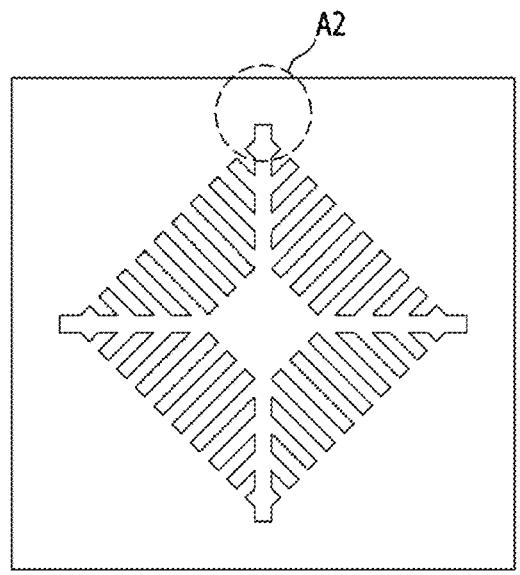
Figure 15B:
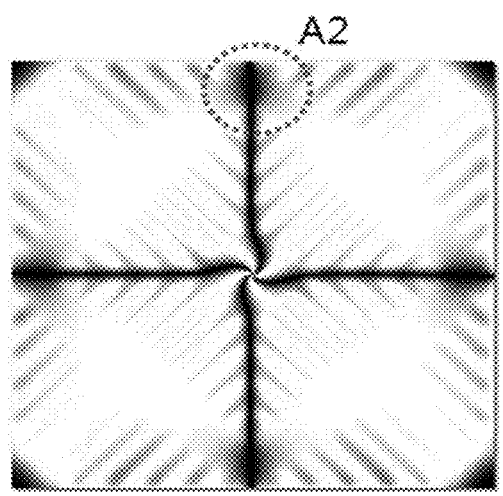

FIG. 14 illustrates a case in which the first stem 193a of the first subpixel electrode 191a includes the protrusion 193a2 and the second plate portion 192b of the second subpixel electrode 191b overlaps with the protrusion 193a2 in the second region A2, like the exemplary embodiment of FIGS. 1 to 6. On the other hand, FIG. 15 illustrates a case in which the first stem 193a of the first subpixel electrode 191a does not include the protrusion 193a2 but only includes a part corresponding to the cross portion 193a1. FIGS. 14A and 15A illustrate the structure of the first subpixel electrode 191a. FIGS. 14B and 15B illustrate the electron microphotographs.

Referring to FIG. 14B, it can be seen that the luminance is deteriorated only on the boundary of the domain, meaning the liquid crystal molecules in the second region A2 are controlled well. However, referring to FIG. 15B, it can be seen that the luminance is deteriorated on the boundary of the domain and around the boundary. It is understood that the difference in the result occurs because the liquid crystal molecules in the second region A2 are controlled by the fringe field generated in the protrusion 193a2 according to the exemplary embodiment of the present system and method.

While the present system and method are described above in connection with exemplary embodiments, the present system and method are not limited to the disclosed embodiments. On the contrary, the present system and method are intended to cover various modifications and equivalent arrangements.

What is claimed is:

1. A liquid crystal display, comprising:
   a lower panel including a pixel electrode having a first subpixel electrode and a second subpixel electrode and an insulating layer disposed between the first subpixel electrode and the second subpixel electrode;
   an upper panel including a common electrode; and
   a liquid crystal layer disposed between the lower panel and the upper panel,
   wherein the first subpixel electrode includes a first plate portion, a first stem having a cross portion extending from the first plate portion in a cross shape and a protrusion extending from the cross portion, and a plurality of first branches extending from the first plate portion and the first stem,
   the second subpixel electrode includes a second plate portion having an opening therein and a plurality of second branches extending from the second plate portion, and
   the cross portion is free from overlap with the second plate portion and the protrusion overlaps with the second plate portion.

2. The liquid crystal display of claim 1, wherein:
   the first subpixel electrode is positioned on the insulating layer and the second subpixel electrode is positioned below the insulating layer.

3. The liquid crystal display of claim 2, wherein:
   the common electrode is formed as a plate.

4. The liquid crystal display of claim 2, wherein:
   the second plate portion surrounds the plurality of first branches.

5. The liquid crystal display of claim 4, wherein:
   the opening of the second plate portion has a planar, rhombus shape.

6. The liquid crystal display of claim 5, wherein:
   an edge of the first branch and an edge of the second plate portion adjacent to the first branch coincide with each other.

7. The liquid crystal display of claim 5, wherein:
   an edge of the first branch and an edge of the second plate portion adjacent to the first branch overlap with each other.

8. The liquid crystal display of claim 1, wherein:
   the first plate portion has a planar, rhombus shape.

9. The liquid crystal display of claim 8, wherein:
   a length corresponding to a distance from the center of the rhombus shaped first plate portion to one side is about 14 μm or less.

10. The liquid crystal display of claim 8, wherein:
    the first stem extends in a diagonal direction of the rhombus shaped first plate portion.

11. The liquid crystal display of claim 1, wherein:
    the first subpixel electrode is configured to receive a first voltage, the second subpixel electrode is configured to receive a second voltage, and
    a ratio of the second voltage to the first voltage is about 0.83 or less.

12. The liquid crystal display of claim 1, wherein:
    the plurality of first branches includes a plurality of minute branches extending in four different directions, and the plurality of second branches includes a plurality of minute branches extending in the four different directions.

13. The liquid crystal display of claim 12, wherein:
the four different directions are orthogonal to each other or parallel to each other.

14. The liquid crystal display of claim 1, wherein:
the plurality of first branches extends from portions of the first stem excluding the protrusion.

\* \* \* \* \*